United States Patent
Basson et al.

(10) Patent No.: US 8,161,143 B2
(45) Date of Patent: Apr. 17, 2012

(54) PRIORITIZATION OF NETWORKS FOR PREFERRED GROUPS

(75) Inventors: Sara H. Basson, White Plains, NY (US); Dimitri Kanevsky, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 3241 days.

(21) Appl. No.: 09/822,703

(22) Filed: Mar. 30, 2001

(65) Prior Publication Data

US 2002/0144147 A1    Oct. 3, 2002

(51) Int. Cl.
*G06F 15/173* (2006.01)

(52) U.S. Cl. ....................................................... 709/223

(58) Field of Classification Search .................. 709/230, 709/227, 203, 200, 201, 205
See application file for complete search history.

(56) References Cited

U.S. PATENT DOCUMENTS

| | | | | |
|---|---|---|---|---|
| 6,584,490 | B1 * | 6/2003 | Schuster et al. ............. | 709/200 |
| 6,661,806 | B1 * | 12/2003 | Eriksson et al. ............. | 370/468 |
| 2001/0025301 | A1 * | 9/2001 | Anderson ..................... | 709/207 |
| 2002/0120763 | A1 * | 8/2002 | Miloushev et al. ........... | 709/230 |

OTHER PUBLICATIONS

William Stallings, "IPv6: The New Internet Protocol," downloaded on Mar. 27, 2001 from http://www.comsoc.org/pubs/surveys/stallings/stallings-orig.html.

* cited by examiner

*Primary Examiner* — Adnan Mirza
(74) *Attorney, Agent, or Firm* — Ryan, Mason & Lewis, LLP

(57) ABSTRACT

The present invention provides prioritization of networks for preferred groups, which decreases network delays when a person from a preferred group is using networks. Generally, the present invention determines if network information is assigned to a preferred group, and configures a network to assign a higher priority to the network information when the network information is assigned to a preferred group, the higher priority being relative to network information not assigned to one or more preferred groups. There are a variety of techniques that can be used to assign higher priority to network information, such as using any of the following exemplary techniques: marking network information as being assigned to a preferred group; preferentially handling, transmitting and receiving network information assigned to a preferred group; determining faster routes for network information assigned to a preferred group; and assigning additional resources to applications that handle network information assigned to a preferred group.

50 Claims, 6 Drawing Sheets

PRIORITIZATION OF NETWORKS FOR PREFERRED GROUPS

FIELD OF THE INVENTION

The present invention relates to networks and, more particularly, relates to prioritization of networks for preferred groups.

BACKGROUND OF THE INVENTION

People With Disabilities (PWD) are often using communication networks or network-based applications for accessing services such as stenographic transcription or situation description. These applications are often time-critical. For example, when a transcriber is interpreting via the Internet for a hearing impaired user, the data passing between them can be delayed at one or both ends. The amount of delay depends on several factors, such as the physical distance between the two, the amount of traffic on the Internet and intermediate networks, if any, and the speed of any servers, routers or switches processing the transactions or routing data from the transactions. This delay can slow stenographic translation to the point where it is frustrating or even impossible.

Other examples where delay over networks becomes problematic are when users use a videophone to communicate using sign language, and when a person helps to direct the movements of a disabled user by watching actions of the disabled user through a camera and then by directing the user.

Another area where large amounts of network delay can be unacceptable is in the medical arena. If a physician is treating or helping to treat a patient who is on a different continent, the time delay between the two can be cumbersome or even dangerous. When medical procedures such as surgery are being performed, having a reasonable delay between the doctor and patient location can be of paramount importance.

Thus, what is needed is a way of reducing or eliminating network delays when certain classes of people are using the network.

SUMMARY OF THE INVENTION

The present invention provides prioritization of networks for preferred groups, which decreases network delays when a person from a preferred group is using networks. Generally, the present invention determines if network information is assigned to a preferred group, and configures a network to assign a higher priority to the network information when the network information is assigned to a preferred group, the higher priority being relative to network information not assigned to one or more preferred groups. There are a variety of techniques that can be used to assign higher priority to network information, such as using any of the following exemplary techniques: marking network information as being assigned to a preferred group; preferentially handling, transmitting and receiving network information assigned to a preferred group; determining faster routes for network information assigned to a preferred group; and assigning additional resources to applications that handle network information assigned to a preferred group.

A more complete understanding of the present invention, as well as further features and advantages of the present invention, will be obtained by reference to the following detailed description and drawings.

DETAILED DESCRIPTION OF PREFERRED EMBODIMENTS

Figure 1:
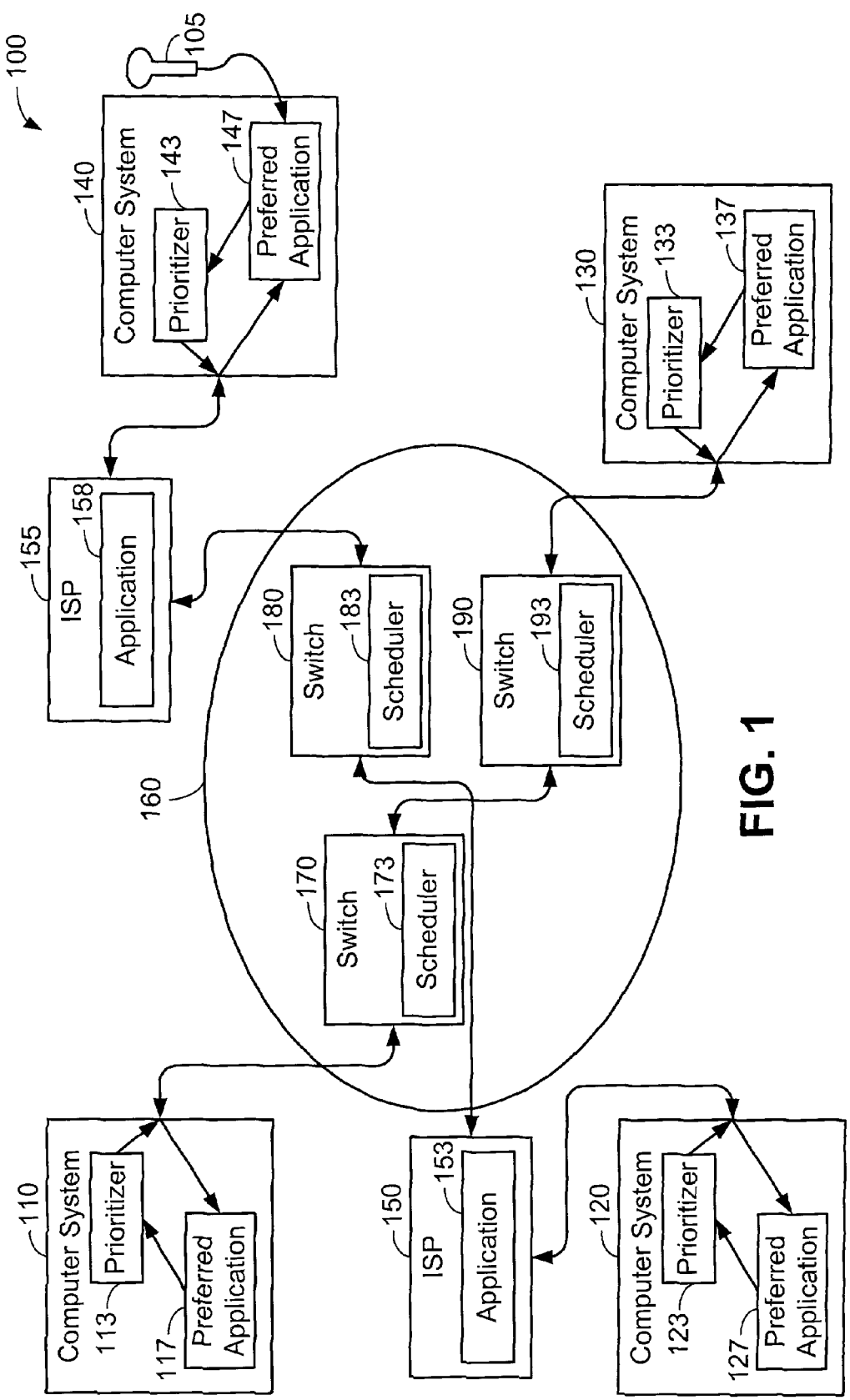
FIG. 1 is a block diagram of a system that prioritizes networks for preferred groups, in accordance with one embodiment of the present invention.

Referring now to FIG. 1, a block diagram is shown of a system 100 that prioritizes network information for preferred groups. System 100 comprises computer systems 110, 120, 130, and 140, Internet Service Providers (ISPs) 150 and 155, and Internet backbone 160. Internet backbone 160 comprises switches 170, 180 and 190, each of which comprises schedulers 173, 183 and 193, respectively. Each ISP 150 and 155 comprises an application 153 and 158, respectively. Each computer system 110, 120, 130 and 140 comprises a prioritizer 113, 123, 133, and 143, respectively, and a preferred application 117, 127, 137 and 147.

In FIG. 1, there are two communications occurring in system 100. The first communication occurs between a person using computer system 140 and a transcriber using computer system 120. One or more People With Disabilities (PWD) are having a meeting with other personnel (not shown) near computer system 140. Microphone 105 receives speech from the meeting. This speech is sent from computer system 140 to a transcriber (not shown) who is using real-time transcription server 120. The transcriber transcribes the speech and the resultant text is again sent from computer system 120 to computer system 140. The second communication occurs between hospital computer system 110 and computer system 130. An internist or doctor is performing a procedure near computer system 110, and is being directed by a physician (not shown) using a medical emergency remote assistant server 130.

Near computer system 140, a meeting between one or more PWD and other personnel is occurring. One or more of the PWD are hearing impaired, and speech from the other personnel needs to be transcribed into text. To accomplish this, data from microphone 105 is routed into preferred application 147, which performs normal signal processing functions on the speech. Illustratively, these functions could include digitizing an analog speech signal, compressing it, ordering it so that it can be reconstructed properly, and packaging it into packets of network information. Prioritizer 143 marks these outgoing pieces of network information with a particular label. This label alerts other network resources that the network information should be prioritized. Prioritizer 143 can determine that the person using the application belongs to a preferred group. This is explained in more detail in reference to FIG. 3. Preferred groups are those groups of individuals that are allowed to prioritize their communications over a network. It should be noted that a preferred group could also comprise a single person. Generally, a network supervisor or other supervisor authorizes certain individuals to have prioritization rights. The prioritization rights usually assigns to those individuals belonging to a certain class, and whose network information is time-critical. Illustratively, these classes comprise PWD, doctors, hospitals, and other medical organizations. Additionally, these prioritization rights may be granted by governmental bodies to PWD or other groups. Usually, unless specified otherwise, the prioritization of networks is performed on a group basis, as a person in a particular group has his or her network information preferentially routed and transmitted. Thus, it is sufficient to determine that a particular individual belongs to a group, such as PWD or doctors. Alternatively, prioritization may be performed on an individual-by-individual basis.

If desired, prioritizer 143 can also determine if the person seeking prioritization approval is performing a particular task that involves a certain application. For example, a doctor who is merely retrieving his or her electronic mail, using an electronic mail program, might not have his or her network information prioritized. However, when the doctor directs an operation, such as by using a medical server or by communicating voice and video through a network, the network information from the doctor should be prioritized. Thus, prioritizer 143 can also base prioritization on the application used by the individual or the function being performed by the individual. In general, however, the individual belongs to a preferred group and with thus have his or her network information prioritized, regardless of what application or function the individual is performing.

As used herein, "network information" is any data that can be transmitted onto or received from a communication network. Generally, this type of information is contained in packets, which are data blocks of certain size that contain one or more headers and possibly footers. Prior to being transferred, however, network information may not yet be broken into packets, and instead is generally stored in a large block of data. Similarly, network information, after being transferred, usually has header and other extraneous information stripped from the packets and is recombined into a large amount of data. After it has been determined that network information belongs to a preferred group and the network information has been marked as prioritized, the network information will be referred to as "prioritized" network information.

The marked network information is transmitted through a network, which could be a dial-up phone line, cable modem, Local Area Network (LAN), or other network, to ISP 155. ISP 155 can prioritize and schedule incoming and outgoing network information by using application 158. Additionally, application 158 can estimate or select potential routes for packets or mark the packets as high priority. When application 158 receives network information from computer system 140, it can determine that the network information is marked as being from a preferred group. Usually, the network information is in the form of packets and each packet is specially marked in a particular location with certain data that identifies the packet as being assigned to a preferred group.

Because this network information is assigned to a preferred group, the scheduler can perform particular tasks to prioritize its part of system 100. In particular, the application 158 can assign a higher priority to the network information and send this network information prior to transmitting other, lower priority network information. It could send the network information without even queuing it. Some ISPs may contain certain routers that themselves contain a number of queues. These queues generally have some type of transmission priority assigned to them, which is assigned using algorithms such as a weighted round robin algorithm. In this case, the application 158 could assign a high weight to the queue containing the network information from computer system 140, place the network information from computer system 140 in a queue with a high weight, or ignore the weighting algorithm and automatically assign the network information the highest weight.

During periods of traffic congestion many routers drop old packets to make room for the new packets. Traffic congestion occurs when a router cannot transmit as fast as it is receiving. Another way for application 158 to prioritize the network is to preferentially drop other packets that do not contain prioritized network information from computer system 140. In this manner, the prioritized network information is preferentially retained and transmitted.

The application 158 also determines a fast route (which could be more direct or contain less switches or routers) and sends the prioritized network information through the fast route. It preferentially accepts prioritized network information from computer system 140, such as by responding quicker to interrupts caused by data received from computer system 140 or providing larger input buffers for prioritized network information from computer system 140. As is known in the art, application 158 can determine which network information is received from computer system 140 because the computer system has a unique Internet Protocol (IP) address and the packets from computer system 140 also contain this IP address, usually in a header. It should be noted that the priority labels of the present invention may be added to a future version of the IP, which would help support the prioritization schemes of the present invention.

Application 158 can also mark the prioritized network information, or packets of the prioritized network information, as higher priority. Some IPs allow packets to be marked with higher priority. For example, the next-generation IP, which is referred to as "IPv6," allows a four-bit priority field in the header of a packet. The 4-bit priority field enables a source to identify the desired transmit and delivery priority of each packet relative to other packets from the same source. The IPv6 is described in a number of Request For Comments (RFCs) from the Internet Engineering Task Force (IETF), such as "The Recommendation for the IP Next Generation Protocol," RFC 1752, 1995, and "Internet Protocol, Version 6 Specification," RFC 1883, 1995, the disclosures of which are incorporated herein by reference. This new IP is also discussed in Huitema, "IPv6: The New Internet Protocol," Prentice Hall, 1996, and Britton et al., "TCP/IP: The Next Generation," IBM Sys. J., No. 3, 1995, the disclosures of which are incorporated herein by reference. Unfortunately, this priority system does not differentiate between all packets; instead, it only differentiates between packets from the same source. In other words, a source (a computer system) might mark video data with higher priority than text data. When data from the source is received at a router, for instance, video data will be given higher priority than the text data. However, data from another source (another computer system) will be given the same priority as the data from any other computer system.

As is known in the art, application 158 can have additional functions, not related to prioritizing networks, such as handling mail and news, filtering content, and establishing connections between computer system 140 and ISP 155.

The network information is transmitted by the ISP 155 to and through the Internet backbone 160. During its travels, the network information reaches switch 180, which contains a scheduler 183. This scheduler 183 is similar to application 158 in that it can assign prioritize network components in order to send the network information as fast as possible. Scheduler 183 determines that the prioritized network information is marked as being from a preferred group, which means that it preferentially processes and transmits the prioritized network information. As with application 158, scheduler 183 can configure its part of system 100 to assign a higher priority to the network information. Any technique for preferentially routing and transmitting the prioritized network information may be used. As discussed above in reference to application 158, these techniques can include assigning a higher priority to packets from the prioritized network information, preferentially keeping the packets while discarding other packets if the scheduler cannot send as fast as it is receiving, transmitting the prioritized network information without placing it in a queue or other buffer, placing the prioritized network information in a queue that has higher priority, marking a queue containing the prioritized network information as higher priority, or analyzing possible routes to find the best route and sending the prioritized network information over that route.

The prioritized network information completes its traversal of Internet backbone 160, ending at ISP 150, which contains another application 153 that is similar to application 158 in ISP 155. Application 153 determines that the prioritized network information is assigned to a preferred group by examining the prioritized network information and finding a label that indicates the prioritized network information is from a preferred group. The application 153 configures its part of system 100 to assign a higher priority to the prioritized network information because it is assigned to a preferred group. Prioritization of the network can entail, as previously discussed, immediately transmitting the prioritized network information without placing it in a queue, placing the prioritized network information in a queue having a high priority, or assigning a high priority to a queue containing the information. Generally, there is a short or direct connection between the ISP 150 and the computer system 120. Because of this, it is unlikely that there would be a better route through which the prioritized network information could be routed, and application 153 generally does not search for such a route. However, the application 153 could assign additional resources to any type of queue or buffer interacting with computer system 120, or preferentially respond to interrupts caused by computer system 120.

Application 153 then preferentially transmits the prioritized network information to computer system 120, which in this example is a real-time transcription server. The real-time transcription server 120 accepts this information, passing it to preferred application 127. Preferred application 127 is a program that plays the network information, which is digitally encoded speech. If necessary, the preferred application 127 can decompress the network information, use error correction on the network information, combine the network information into analog speech, or decode encrypted speech in the network information. A transcriber, hearing the audio from microphone 105 as it has been transmitted across the Internet, can transcribe the audio into text. This text next makes its way back across the Internet.

The preferred application 127 takes the necessary steps to package the text into network information, which could include creating packets of text, encrypting or compressing the text, or using other well known tools to send data across a network. It should be noted that packaging and transmitting the data can also be performed by a Transmission Control Protocol/Internet Protocol (TCP/IP) application or stack. The prioritizer 123 then marks outgoing network information, which is usually in the form of packets, with a label that indicates the network information is assigned to a preferred group. The prioritizer may be part of a TCP/IP application or stack. The label, as discussed below, is generally part of a header of a packet. The network information is now marked as prioritized.

The prioritized network information is sent to ISP 150 and its application 153, which then determines that the prioritized network information is from a preferred group. The application 153 takes the necessary steps to prioritize its part of system 100 so that the prioritized network information is preferentially handled and transmitted.

The prioritized network information is routed to and through Internet backbone 160, where it again reaches switch 180, which contains scheduler 183. In general, a packet of network information may not pass through the same switch, as the Internet has many different paths available for a packet to be routed. However, it could be that the application 153 has chosen this particular route as being fastest, and has routed the prioritized network information through this fast route. Again, scheduler 183 determines that the prioritized network information is assigned to a preferred group, and takes steps to configure its part of the system 100 to preferentially process and transmit the prioritized network information. The scheduler 183 chooses a suitably fast route to ISP 155, which also uses its application 158 to preferentially route and transmit the prioritized network information to the computer system 140 in location 107.

The computer system 140 then uses preferred application 147 to display the text, received from real-time transcription server 120, on a display or other visual aid (not shown in FIG. 1). Preferred application 147 takes the necessary steps to recreate the original text, such as decompressing and decrypting the network information, performing error correction coding, and packaging the network information into a data stream.

In another embodiment of the present invention, the ISP 155 is instead a firewall 155 that is connected to computer system 140. In this embodiment, the firewall 155 contains a firewall application 158 that can block incoming and outgoing network information. Firewall application 158, upon determining that the network information is assigned to a preferred group, passes the network information through the firewall, and takes the appropriate steps to prioritize part of system 100 so that the network information is preferentially and speedily transferred.

Thus, the present invention prioritizes system 100 to preferentially transmit and receive network information from preferred groups. The communication information between a PWD at location 107 and the real-time transcription server 120 is preferentially sent and received at locations in system 100, which improves the delay associated with, speed of, and overall communication.

A second communication is occurring in FIG. 1 between computer system 130 and computer system 110. Computer system 130 is a medical emergency remote assistant server at which a doctor (not shown) is helping with or directing a procedure being performed near computer system 110. A medical assistant or other physician (also not shown) is using computer system 110, which for example is in a hospital located in a remote region far from medical emergency remote assistant server 130. Medical emergency remote assistant server 130 has a preferred application 137 running that accepts input from the doctor (the input is also not shown). This could be a visual input, such as from a camera, text or audio. This information is packaged and sent to prioritizer 133, which then marks the network information as belonging to a preferred group. This information is now marked as prioritized.

The medical emergency remote assistant server 130 sends the prioritized network information to the Internet backbone 160. While traversing Internet backbone 160, the prioritized network information passes through switches 190 and 170, each of which contains a scheduler 193 and 173, respectively. Each scheduler 193, 173 examines a location for the label, reads the label and determines that the prioritized network information is assigned to a preferred group. Each scheduler 193, 173 then configures its part of system 100 to assign a higher priority to this prioritized network information. Such configuration has already been discussed in reference to applications 158 and 153 and scheduler 183. The prioritized network information then passes through switch 170 and to hospital computer system 110.

Hospital computer system 110 receives the information and preferred application 117 displays it, performing whatever steps are necessary to recreate the information into its original form. At hospital computer system 110, another doctor or medical assistant (not shown) reacts to the information and creates his or her own response. This response is then packaged by preferred application 117 to be sent back onto the system 100. Prioritizer 113 examines the network information, makes a decision that the network information is from a preferred group, and marks the network information with a label to indicate that the network information is from a preferred group. This network information is now marked as prioritized. The network information, complete with label, is transmitted onto the Internet and passes into and through Internet backbone 160. Again, switches 170 and 190 are traversed, which determines that the network information is from a preferred group and takes steps to prioritize their parts of system 100 to preferentially process and transmit the network information. The network information finally arrives back medical emergency remote assistant server 130, at which the preferred application 137 repackages the information into its original form.

Thus, FIG. 1 shows a system 100 where parts of the network are able to be configured to preferentially process, send and receive network information that is assigned and belongs to a preferred group. It should be noted that system 100 can optionally assign different groups to have different priorities, such as having priority labels indicated the relative priority of the groups.

Figure 2:
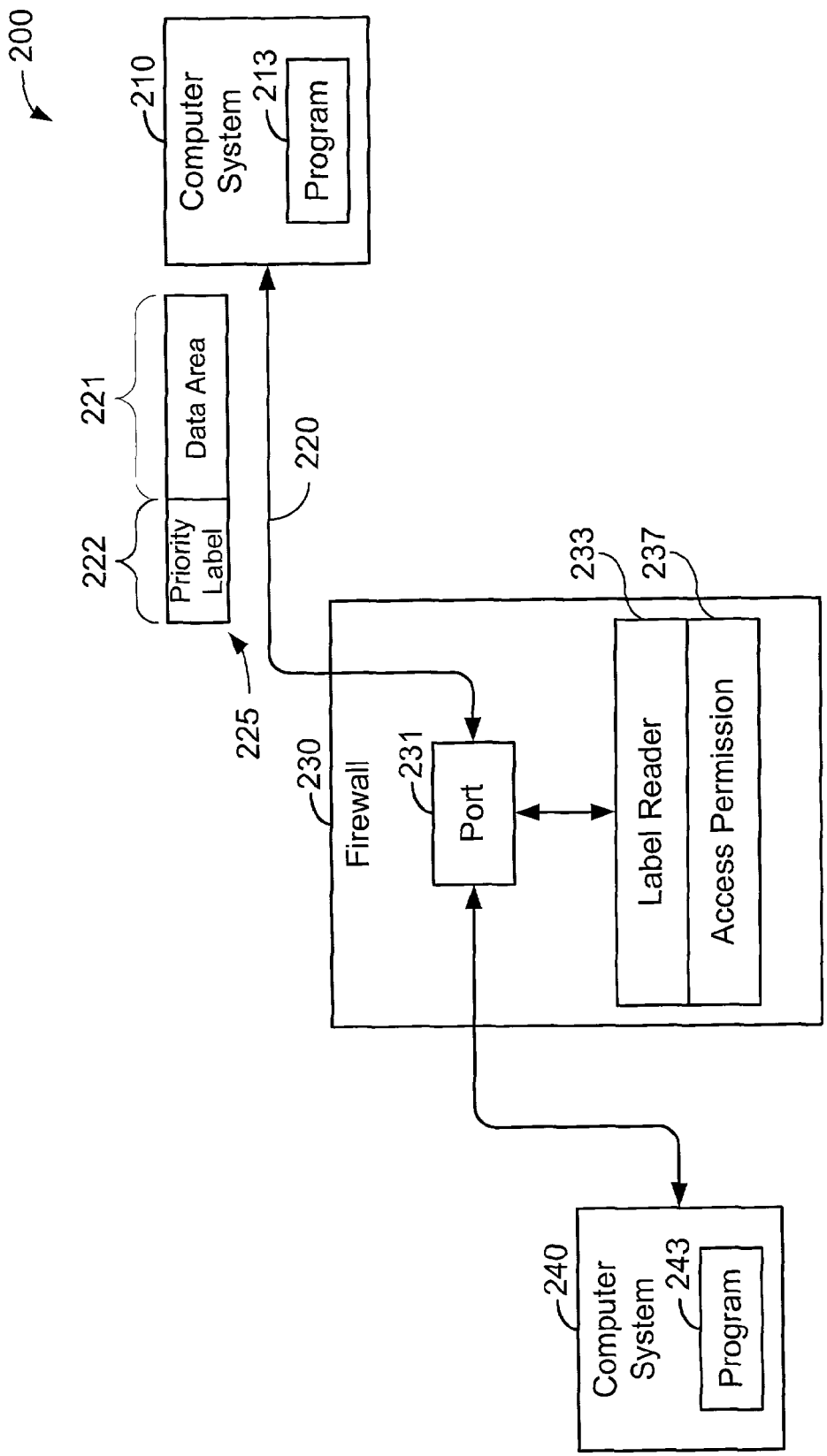
FIG. 2 is a block diagram of a system that prioritizes networks for preferred groups, in accordance with one embodiment of the present invention.

Turning now to FIG. 2, a block diagram is shown of another system 200 that prioritizes network information. System 200 comprises a computer system 210, a firewall 230, and a second computer system 240. Computer system 210 contains a program 213 that comprises the functionality of the prioritizers discussed in reference to FIG. 1. Firewall 230 comprises a port 231, a label reader 233, and an access permission module 237. Computer system 240 contains another program 243 that also comprises the functionality of the prioritizers discussed in reference to FIG. 1. In this example, programs 243 and 213 also comprise the functionality of the previously discussed preferred applications, in that they can accept, transmit, receive, and display information.

FIG. 2 shows an example of a firewall situation where network information 225, which in this example is a packet of data, is needed by a person with a disability. The person with the disability is using computer system 210 and attempting to transmit the packet 225 to computer system 240. Packet 225 comprises a data area 221 and a preferred group label 222. Preferred group label 222 may be part of a header (not shown) or may be completely separate from the header. In this case, the header could be part of data area 221. Some firewalls typically do not allow data from certain applications, e.g., like NetMeeting (an application that supports video and sound), to be accessed through the firewalls. Firewall 230 controls port 231 through which information will pass. In many cases, high bandwidth applications such as NetMeeting may be blocked to prevent large uses of bandwidth. However, such applications are often critical for certain groups, such as People With Disabilities (PWD) or surgeons. In these situations, firewall 230 should pass packets from applications that are being used by these groups.

In FIG. 2, packet 225 has priority label 222 that indicates the packet is created by a person from a preferred group, which in this situation is an individual belonging to a PWD group. The label reader 233 checks for the priority label 222. If the label reader 233 determines that communication is not permitted for program 213 but that a packet contains the proper priority label 222, the access permission module 237 allows the packet through the firewall 230. Access permission module 237, once the proper priority label 222 is determined, opens the port 231 to allow access between programs 243 and 213. Additionally, access permission module 237 additionally modifies firewall 230 to allow additional packets received by the firewall 230 to pass through faster. For instance, the port 231 could be given additional resources or preferential treatment if the port 231 interrupts.

Figure 3:
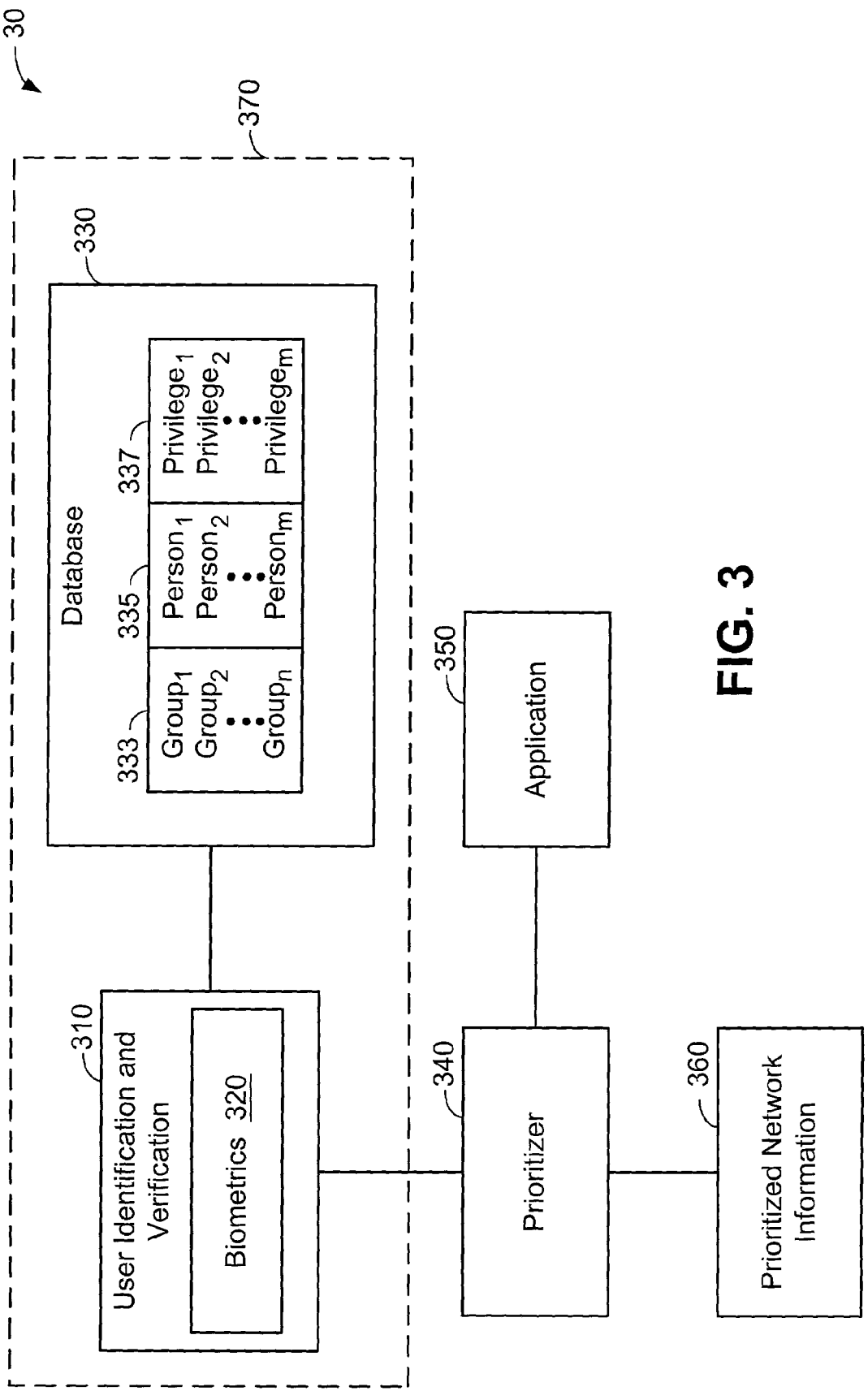
FIG. 3 is a block diagram of a system for identifying and verifying a user as being one of a preferred group, in accordance with one embodiment of the present invention.

Referring now to FIG. 3, a block diagram of a system 300 is shown that identifies and verifies a user as being one of a preferred group. System 300 comprises a user identification and verification module 310, a database 330, a prioritizer 340, an application 350, and prioritized network information 360. User identification and verification module 310 optionally comprises a biometrics module 320. In order to prevent any users who are not part of a preferred group from labeling data, from an application, with the priority label, the user identification and verification module 310 checks passwords and login information against approved personnel and groups in database 330. Furthermore, biometrics module 320 checks biometric data against biometrics information in database 330. Biometrics could be voice, a fingerprint, an iris scan, or other known biometric analyses.

In one embodiment, database 330 contains a group block 333, which contains a list of associated groups, and, for each group block a personnel block 335. In FIG. 3, personnel block 335 corresponds to Group$_1$. For simplicity, this is the only personnel block shown, but generally each group corresponds to an equivalent personnel block. It is also possible that each person could belong to one large group. Each personnel record in personnel block 335 contains all necessary user identification, passwords, and/or biometric data to allow user identification and verification module 310 and its biometrics module 320 to verify that the user is part of a preferred group. This is described by the patent application identified by U.S. Ser. No. 09/079,754, filed May 15, 1998, entitled "Apparatus and Method for User Recognition Employing Behavioral Passwords," the disclosure of which is incorporated herein by reference.

If the user identification and verification module 310 verifies the user as belonging to a preferred group, the prioritizer 340 marks network information produced by application 350 as prioritized to create prioritized network information 360. This entails, as shown in FIG. 2, placing a label on each packet. Any mechanism for identifying a packet as prioritized may be used. The label identifies the packet as belonging to a preferred group.

It should be noted that user identification and verification module 310 periodically updates the prioritizer 340 with the status of the person 335. For instance, it is possible that a user could be temporarily disabled. In this situation, the user could require prioritization status during the period of disability but not afterwards. The user identification and verification module 310 periodically refreshes prioritization status of the user and, when the user is removed from group block 333 and person block 335, informs the prioritizer 340 that the user is no longer part of a preferred group.

In another embodiment, database 330 and user identification and verification module 310 act as a certification center 370. In this embodiment, database 330 also contains a prioritization privilege block 337, which contains a number of prioritization privileges. Each prioritization privilege in prioritization privilege block 337 corresponds to a person in person block 335. The user identification and verification module 310 updates database 330 with appropriate users. Biometrics 320 is used to determine if a user is a person in the database 335. Additionally, the biometrics 320 is also used to determine if a person, who is changing the prioritization privilege 337 of a user in person block 335, has the appropriate authority to change the prioritization privilege of another person. For example, the certification center 370 could be controlled by a government and allow only certain individuals to make changes, deletions or additions to database 330. In this case, the biometrics 320 determines that a person attempting to change the database is allowed to make such a change. In this manner, the certification center 370 acts as a central location to which prioritizers 340 have access and is uses to determine if an individual has appropriate prioritization privileges.

Prioritization privileges 337 operate in a variety of ways. For instance, each prioritization privilege 337 may be a simple status, which indicates whether a person has or does not have prioritization privileges. Alternatively, each prioritization privilege might be more complex and indicate, e.g., a prioritization level (for instance, high, medium or low), dates for prioritization (for example, May 3rd through May 30th), and/or specific purposes or uses (such as NetMeeting or medical services).

With this embodiment of system 300, a prioritizer 340 requests a prioritization privilege of an individual from certification center 370. User identification and verification module 310, using password, account and/or biometrics information supplied by prioritizer 340, then accesses database 330. The user identification and verification module 310 determines if the individual belongs to a preferred group 333, and, if so, if the individual has prioritization privileges 337. The user identification and verification module 310 determines, based on the prioritization privilege 337 for the individual, if network information assigned to the individual should be prioritized. This information is passed to prioritizer 340, and comprises a simple indication of priority (i.e., "yes, the network information assigned to this individual should be prioritized" or "no, the network information assigned to this individual should not be prioritized") or a more complex prioritization (i.e., "the network information for this individual should be assigned a high priority" or "the network information for this individual should be assigned a high priority, but this prioritization should be removed on May 30th").

In this embodiment, the prioritizer 340 then acts on the prioritization privilege of the individual, and modifies its portion of a network to prioritize the network information assigned to the individual, if the individual belongs to a preferred group. Additionally, the prioritizer 340 generally caches the prioritization privilege of the individual and periodically requests an update of the prioritization privilege.

It is also possible, in this embodiment, for the prioritization privilege 337 to contain settings that network information from the user is not to be prioritized. As an illustration, each person in a large corporation could be listed in group block 333, individual block 335, and prioritization privileges 337. Those personnel whose network information is to be prioritized have the necessary prioritization privileges 337. However, those personnel whose network information is not to be prioritized may also contain prioritization privileges 337, but prioritization privileges 337 are marked such that prioritization for these personnel is not allowed.

Thus, FIG. 3 also illustrates a certification center that acts as a centralized processing facility that allows and verifies prioritization of networks for certain individuals.

Figure 4:
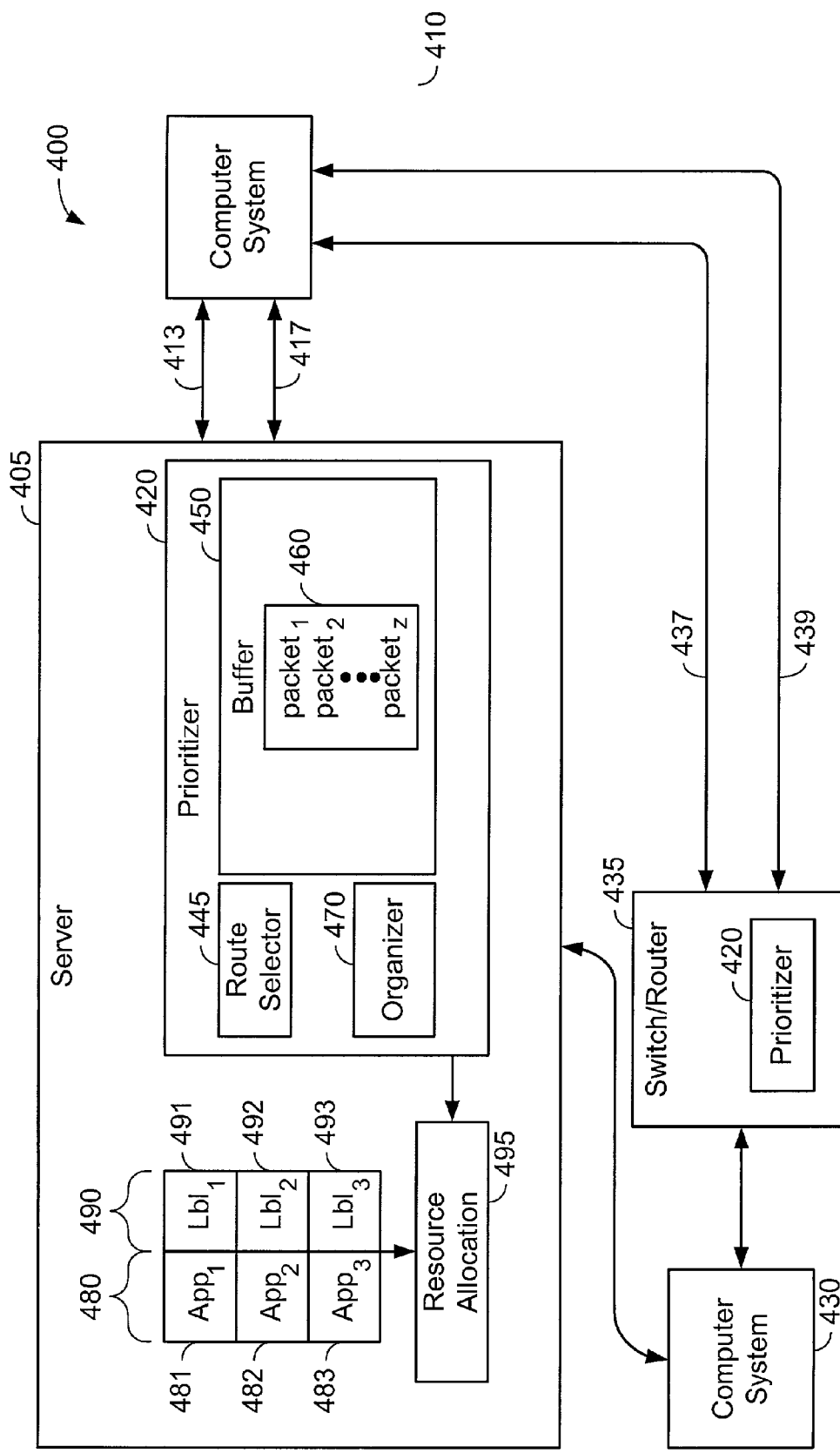
FIG. 4 is a block diagram of a system that prioritizes networks for preferred groups, in accordance with one embodiment of the present invention.

Turning now to FIG. 4, a block diagram is shown of another system 400 that prioritizes networks for preferred groups. System 400 comprises a server 405, a computer system 410, a second computer system 430, a switch or router 435, and several possible network paths 413, 417, 437, 439. Server 405 comprises applications 480 and priority labels 490, resource allocation module 495, and scheduler 420. Applications 480 currently comprise three applications 481, 482 and 483, each of which has a priority label 490: application 481 has a priority label 491; application 482 has a priority label 492; and application 483 has a priority label 493. Scheduler 420 has a route selector module 445, a packet organizer 470, and a buffer 450, which itself contains a queue 460 containing a number of packets scheduled to be transmitted.

System 400 illustrates several examples of how prioritization occurs with packets that are marked as assigned to a preferred group. One example is when server 405 contains several applications that are running, such as applications 481 through 483. Two of these applications could be NetMeeting (which is an application that supports video and sound) and WebEx (which is a company that provides associated programs for real-time communication services like networked meetings, dedicated meeting coordination services and custom meeting facilitation services). In system 400, there is a communication taking place between computers 410 and 430. These two computers are sharing an interface. The speed of the display on both computers depends on the speed of the applications 480.

Server 405 uses scheduler 420 that looks at the importance of the packets and checks for a priority label. Each application 481 through 483 has a priority label 491 that indicates whether the application is being used by a person assigned to a preferred group. The prioritizer 405 examines incoming and outgoing packets to determine if they are assigned to a preferred group and to determine to which application, if any, the packets are being routed. Applications that are receiving, transmitting or using packets that contain priority labels are assigned a particular value in its associated priority label 490. For example, if application 482 is a NetMeeting application that is operating on data from a PWD who is using computer system 410, the packets of network information from computer system 410 are marked as prioritized. The prioritizer 420 determines that the packets are marked as prioritized and marks label 492 with an appropriate value that indicates the application 482 should also be prioritized. Application 482 are then assigned more resources by resource allocation module 495. Additional resources for these prioritized applications allow them to run at higher efficiency and therefore place a higher priority on these applications than other applications, which are not involved with interacting with or handling packets assigned to preferred groups.

Another example illustrated by FIG. 4 that allows the packets to be sent faster concerns the buffer 450. The buffer 450 holds the packets before they are shipped out and sorted. The packet organizer 470 sorts the packets, in queue 460, including the packets that are assigned to preferred groups. The packets assigned to preferred groups are prioritized first and thereby transmitted first. This prioritization could be through reordering the packets or by marking each packet with a priority. Alternatively, there could be additional queues (not shown), each of which has a priority. The priority of queue 460 could be assigned a high priority by packet organizer 470.

Yet another example of prioritization of networks concerns route selector 445. Route selector 445 attempts to find the fastest route through which the packets could be sent. Routes 413 and 417 are routes through which the packets could be sent. The selection criterion between the two routes is the fastest time, and generally not the shortest distance or smallest number of transfers. The latter are, however, usually good indications of short travel times, and thus may also be used. Route selector 445 chooses between route 413 and 417 based on this criterion.

Switch or router 435 also contains a scheduler 420. This occurs for situations where there is more of a direct connection between the two computer systems 410 and 420. Again, the switch or router 435 may, using scheduler 420, select the fastest route between any number of possible routes. Route 437 and 439 are examples of possible routes that may be chosen.

Figure 5:
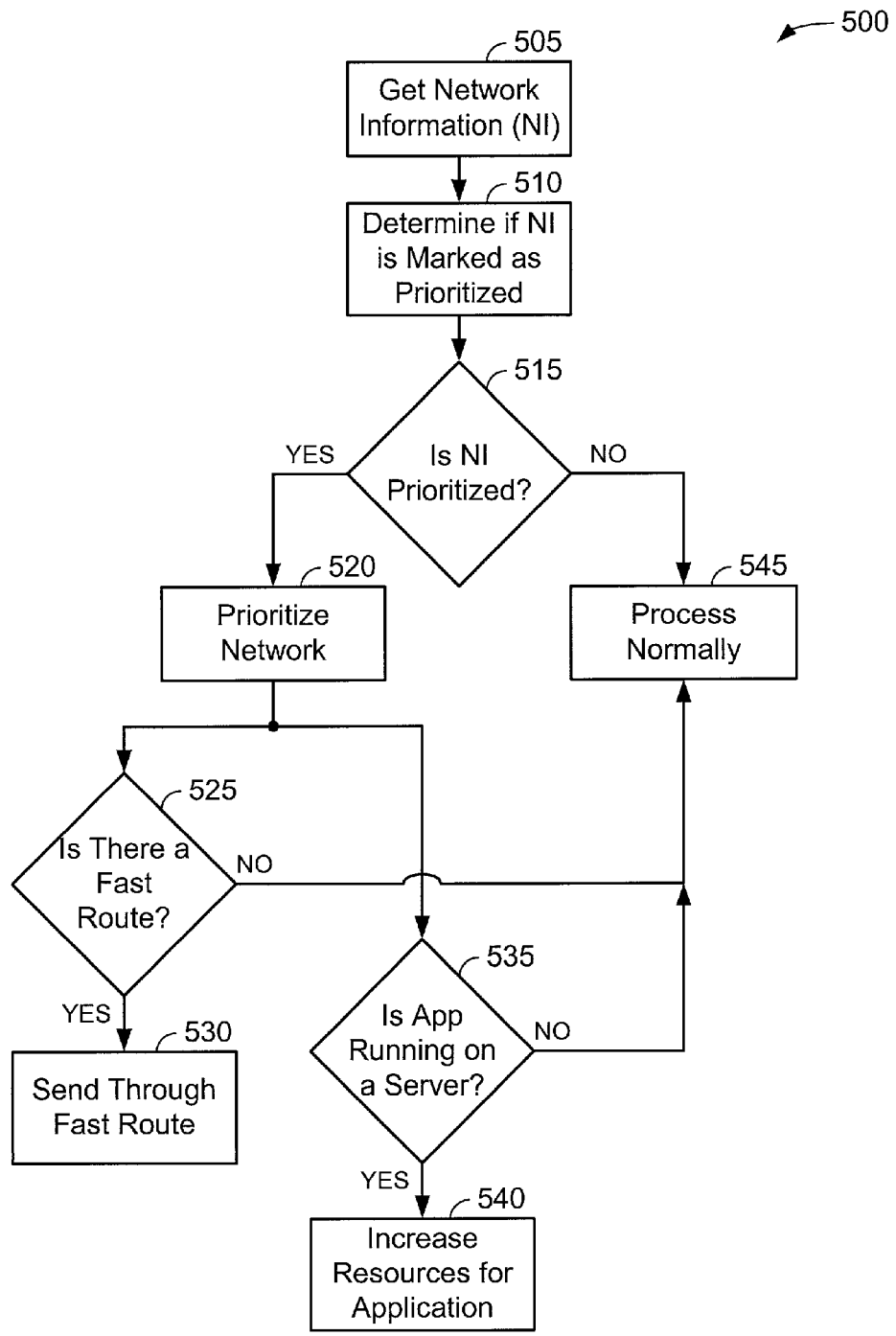
FIG. 5 is a flowchart of a method for prioritizing networks if network information belongs to a preferred group, in accordance with one embodiment of the present invention.

Turning now to FIG. 5, a flowchart is shown of a method 500 for prioritizing networks when network information belongs to a preferred group. Method 500 is used after network information has already been marked as being associated with a preferred group. For instance, a prioritizer could mark packets of network information as being assigned to a preferred group.

Method 500 begins in step 505, when network information is received. In step 510, it is determined if the network information is marked as prioritized. As previously discussed, this usually entails examining a priority label in a particular position in a packet of network information. The priority label indicates if the network information is from a preferred group. If the network information has the appropriate priority label, indicating that the network information is from a preferred group, then the network information is considered to be "prioritized." In step 515, a decision is made as to whether the network information is prioritized. If the network information is not prioritized (step 515=NO), then the network information is processed normally.

Conversely, if the network information is prioritized (step 515=YES), then the network or a portion of the network is prioritized (step 520). To prioritize a network, in step 520, the network information is assigned a higher priority by performing one or more of the following techniques: adding it to a higher priority queue; adding it to a special queue that has high or very high priority; marking the queue in which it is contained as high priority; sending it directly (without placing it into a queue); and dropping other packets instead of packets of network information (which can occur for routers where the router is receiving faster than it can send). Additionally, the network may be prioritized by modifying the transmission, reception and handling systems to preferentially process the network information.

Additionally, other steps are taken to prioritize the network. In step 525, a decision is made as to whether there is a fast route over which the packet of prioritized network information may be sent. If not (step 525=NO), then the packet is sent over the network in any manner possible. If there is a fast route that can be selected (step 525=YES), then the packet is sent through the fast route (step 530).

In step 535, it is determined if there is an application running on a server that is handling the prioritized network information. If there is an application handling the prioritized network information (step 535=YES), then the application is marked as prioritized and its resources are increased (step 540). This step could include allocating additional memory or disk space, prioritizing the application to run prior to or longer than other applications (if the system is multitasking), or sending messages to the application faster than normal or even immediately. If there is no application running on a server (step 535=NO), then the application is treated normally (step 545).

Thus, method 500 allows received network information to be examined and a network configured appropriately in response, in order to prioritize the network information if the network information is assigned to a preferred group.

Figure 6:
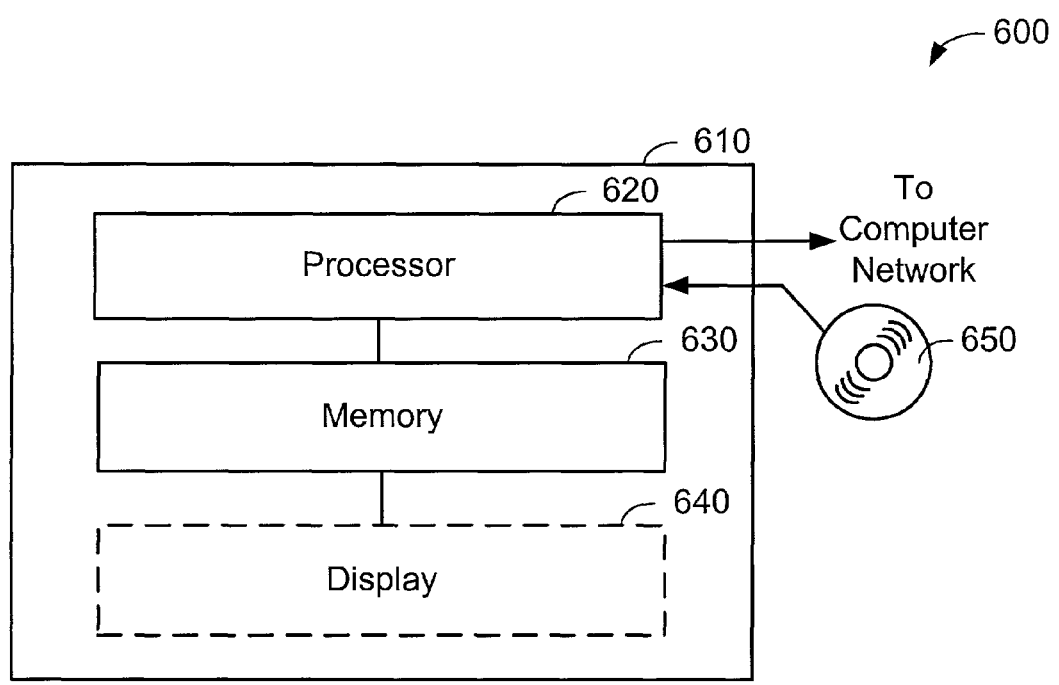
FIG. 6 is a block diagram of a system for prioritizing networks for preferred groups.

Turning now to FIG. 6, a block diagram of a system 600 for prioritizing networks for preferred groups is shown. System 600 comprises a computer system 610 and a Compact Disk (CD) 650. Computer system 610 comprises a processor 620, a memory 630 and an optional display 640. It is to be understood that computer system 610 comprises one or more of the computer systems discussed in FIGS. 1 through 4.

As is known in the art, the methods and apparatus discussed herein may be distributed as an article of manufacture that itself comprises a computer-readable medium having computer-readable code means embodied thereon. The computer readable program code means is operable, in conjunction with a computer system such as computer system 610, to carry out all or some of the steps to perform the methods or create the apparatuses discussed herein. The computer-readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk, such as compact disk 650.

Memory 630 configures the processor 620 to implement the methods, steps, and functions disclosed herein. The memory 630 could be distributed or local and the processor 620 could be distributed or singular. The memory 630 could be implemented as an electrical, magnetic or optical memory, or any combination of these or other types of storage devices. Moreover, the term "memory" should be construed broadly enough to encompass any information able to be read from or written to an address in the addressable space accessed by processor 610. With this definition, information on a network is still within memory 630 because the processor 620 can retrieve the information from the network. It should be noted that each distributed processor that makes up processor 620 generally contains its own addressable memory space. It should also be noted that some of all of computer system 610 can be incorporated into an application-specific or general-use integrated circuit.

Optional display 640 is any type of display suitable for interacting with a human user of system 600. Generally, display 640 is a computer monitor or other similar video display.

Thus, what has been shown is a way of prioritizing networks so that preferred groups are given priority over non-preferred groups. The prioritization operates in the background, yet provides a measurable improvement for those people who need faster network transmissions.

It is to be understood that the embodiments and variations shown and described herein are merely illustrative of the principles of this invention and that various modifications may be implemented by those skilled in the art without departing from the scope and spirit of the invention. For instance, each group can be assigned its own priority, which allows network information from surgery to take precedence over network information from transcription for a PWD (or vice versa).

What is claimed is:

1. A method for prioritization of a network for one or more preferred groups, the method comprising the steps of:
   a) determining if network information is assigned to one or more preferred groups; and
   b) configuring a network to assign a higher priority to the network information when the network information is assigned to one or more preferred groups, the higher priority being relative to network information not assigned to one or more preferred groups.

2. The method of claim 1, wherein step (b) further comprises the step of marking the network information assigned to one or more of the preferred groups with a label, the label indicating that the network information is assigned to a preferred group.

3. The method of claim 2:
   further comprising the step of receiving the network information;
   wherein step (a) further comprises the step of determining that the network information assigned to one or more of the preferred groups comprises the label; and
   wherein step (b) further comprises the step of transmitting the network information assigned to one or more of the preferred groups before previously received network information is sent, the previously received network information not assigned to one or more of the preferred groups.

4. The method of claim 2:
   further comprising the step of receiving the network information;
   wherein step (a) further comprises the step of determining that the network information assigned to one or more of the preferred groups comprises the label; and
   wherein step (b) further comprises the step of assigning priority of information within a queue, wherein the queue comprises additional network information that does not have the label and that was received before the network information having the label, and wherein the network information having the label is assigned higher priority than the additional network information.

5. The method of claim 4, wherein step (b) further comprises the step of transmitting, based on the priority, the network information having the label before the additional network information, which does not have the label, is transmitted.

6. The method of claim 2:
   further comprising the step of receiving the network information;
   wherein step (a) further comprises the step of determining that the network information assigned to one or more of the preferred groups comprises the label; and
   wherein step (b) further comprises the steps of:
      determining if there is a fast path over which the network information assigned to one or more of the preferred groups can be sent; and
      transmitting the network information assigned to one or more of the preferred groups over the fast path when there is a fast path.

7. The method of claim 1, wherein step (b) further comprises the steps of:
   determining if the network information assigned to one or more of the preferred groups is being routed to or from an application running on a server; and
   increasing resources of the application when the application is running on a server and when the network information assigned to one or more of the preferred groups is assigned to a preferred group.

8. The method of claim 1, wherein step (a) further comprises the steps of:
   identifying a user;
   determining if a user belongs to a preferred group; and
   assigning network information to a preferred group when the user belongs to a preferred group.

9. The method of claim 8:
   wherein step (a) further comprises the step of determining, when the user does belong to a preferred group, if the user is using an application for a preferred purpose; and
   wherein the step of assigning network information to a preferred group when the user belongs to a preferred group further comprises the step of assigning network information to a preferred group when the user belongs to the preferred group and when the user is using an application for a preferred purpose.

10. The method of claim 8 wherein the step of assigning network information to a preferred group when the user belongs to a preferred group further comprises marking the network information with a label, indicating that the network information is assigned to a preferred group, when the user belongs to a preferred group.

11. The method of claim 1, wherein the preferred groups comprise one or more of people with disabilities and medical professionals.

12. The method of claim 1, wherein step (b) further comprises the steps of:
   determining, at a firewall, if an application is to be blocked; and
   blocking network information from or to the application unless the network information is assigned to a preferred group.

13. The method of claim 1, wherein step (a) further comprises the steps of:
   comparing input biometric data from an individual with stored biometric data in a database;
   determining if the input biometric data matches the stored biometric data; and
   determining that the network information belongs to a preferred group when the input biometric data matches the stored biometric data.

14. A method for prioritization of networks for preferred groups, the method comprising the steps of:
   requesting a prioritization privilege of an individual;
   determining, by accessing a database, the prioritization privilege of the individual; and
   configuring a network to assign a higher priority to network information assigned to the individual when the prioritization privilege indicates that the network information belongs to a preferred group.

15. The method of claim 14, wherein the prioritization privilege comprises one or more of dates of use information, prioritization level information, and purpose information.

16. The method of claim 14, wherein the step of configuring further comprises marking the network information with a label, which indicates that the network information belongs to a preferred group, when the prioritization privilege indicates that the network information belongs to a preferred group.

17. A method for prioritization of a network for one or more preferred groups, the method comprising the steps of:
   determining if an individual belongs to one or more preferred groups;
   marking network information associated with the individual with a priority label; and
   configuring a network to assign a higher priority, as compared to network information not marked with a priority label, to the marked network information.

18. The method of claim 17, wherein the step of marking network information associated with the individual with a priority label comprises the step of marking network information produced by an application the individual is using with a priority label.

19. The method of claim 17, wherein the step of determining if an individual belongs to one or more preferred groups comprises the steps of:
   determining if the individual exists in a database that comprises the one or more preferred groups;
   determining a priority privilege of the individual when the individual exists in the database; and
   determining, when the individual exists in the database, if the priority privilege indicates that network information associated with the individual is to be prioritized.

20. The method of claim 19, wherein the step of determining if an individual exists in a database that comprises the one or more preferred groups comprises the steps of:
   determining if biometric data entered by the individual matches biometric data for a person in the database; and
   determining that the person is the individual and that the individual exists in the database when the biometric data entered by the individual matches biometric data for a person in the database.

21. A system for prioritization of a network for one or more preferred groups, the system comprising:
   a memory that stores computer-readable code; and
   a processor operatively coupled to the memory, the processor configured to implement the computer-readable code, the computer-readable code configured to:
   a) determine if network information is assigned to one or more preferred groups; and
   b) configure a network to assign a higher priority to the network information when the network information is assigned to one or more preferred groups, the higher priority being relative to network information not assigned to one or more preferred groups.

22. The system of claim 21, wherein the computer-readable code is further configured, when performing step (b), to mark the network information assigned to one or more of the preferred groups with a label, the label indicating that the network information is assigned to a preferred group.

23. The system of claim 22:
   wherein the computer-readable code is further configured to receive the network information;
   wherein the computer-readable code is further configured, when performing step (a), to determine that the network information assigned to one or more of the preferred groups comprises the label; and
   wherein the computer-readable code is further configured, when performing step (b), to transmit the network information assigned to one or more of the preferred groups before previously received network information is sent, the previously received network information not assigned to one or more of the preferred groups.

24. The system of claim 21, wherein the computer-readable code is further configured, when performing step (b), to:
   determine if the network information assigned to one or more of the preferred groups is being routed to or from an application running on a server; and
   increase resources of the application when the application is running on a server and when the network information assigned to one or more of the preferred groups is assigned to a preferred group.

25. The system of claim 21, wherein the computer-readable code is further configured, when performing step (a), to:
   identify a user;
   determine if a user belongs to a preferred group; and
   assign network information to a preferred group when the user belongs to a preferred group.

26. The system of claim 21, wherein the preferred groups comprise one or more of people with disabilities and medical professionals.

27. The system of claim 21, wherein the computer-readable code is further configured, when performing step (b), to:
   determine, at a firewall, if an application is to be blocked; and
   block network information from or to the application unless the network information is assigned to a preferred group.

28. The system of claim 21, wherein the computer-readable code is further configured, when performing step (a), to:
   compare input biometric data from an individual with stored biometric data in a database;
   determine if the input biometric data matches the stored biometric data; and
   determine that the network information belongs to a preferred group when the input biometric data matches the stored biometric data.

29. A system for prioritization of a network for one or more preferred groups, the system comprising:
   a memory that stores computer-readable code; and
   a processor operatively coupled to the memory, the processor configured to implement the computer-readable code, the computer-readable code configured to:
   request a prioritization privilege of an individual;
   determine, by accessing a database, the prioritization privilege of the individual; and
   configure a network to assign a higher priority to network information assigned to the individual when the prioritization privilege indicates that the network information belongs to a preferred group.

30. The system of claim 29, wherein the prioritization privilege comprises one or more of dates of use information, prioritization level information, and purpose information.

31. The system of claim 29, wherein the computer-readable code is further configured, when configuring a network, to mark the network information with a label, which indicates that the network information belongs to a preferred group, when the prioritization privilege indicates that the network information belongs to a preferred group.

32. A system for prioritization of a network for one or more preferred groups, the system comprising:
   a memory that stores computer-readable code; and
   a processor operatively coupled to the memory, the processor configured to implement the computer-readable code, the computer-readable code configured to:
   determine if an individual belongs to one or more preferred groups;
   mark network information associated with the individual with a priority label; and configure a network to assign a higher priority, as compared to network information not marked with a priority label, to the marked network information.

33. The system of claim 32, wherein the computer-readable code is further configured, when marking network information associated with the individual with a priority label, to mark network information produced by an application the individual is using with a priority label.

34. The system of claim 32, wherein the computer-readable code is further configured, when determining if an individual belongs to one or more preferred groups, to:
determine if the individual exists in a database that comprises the one or more preferred groups;
determine a priority privilege of the individual when the individual exists in the database; and
determine, when the individual exists in the database, if the priority privilege indicates that network information associated with the individual is to be prioritized.

35. The system of claim 34, wherein the computer-readable code is further configured, when determining if an individual exists in a database that comprises the one or more preferred groups, to:
determine if biometric data entered by the individual matches biometric data for a person in the database; and
determine that the person is the individual and that the individual exists in the database when the biometric data entered by the individual matches biometric data for a person in the database.

36. An article of manufacture comprising:
a non-transitory computer-readable medium having computer-readable code embodied thereon, the computer-readable code comprising:
a) a step to determine if network information is assigned to one or more preferred groups; and
b) a step to configure a network to assign a higher priority to the network information when the network information is assigned to one or more preferred groups, the higher priority being relative to network information not assigned to one or more preferred groups.

37. The article of manufacture of claim 36, wherein the computer-readable code further comprises, when performing step (b), a step to mark the network information assigned to one or more of the preferred groups with a label, the label indicating that the network information is assigned to a preferred group.

38. The article of manufacture of claim 36:
wherein the computer-readable code further comprises a step to receive the network information;
wherein the computer-readable code further comprises, when performing step (a), a step to determine that the network information assigned to one or more of the preferred groups comprises the label; and
wherein the computer-readable code further comprises, when performing step (b), a step to transmit the network information assigned to one or more of the preferred groups before previously received network information is sent, the previously received network information not assigned to one or more of the preferred groups.

39. The article of manufacture of claim 36, wherein the computer-readable code further comprises, when performing step (b):
a step to determine if the network information assigned to one or more of the preferred groups is being routed to or from an application running on a server; and
a step to increase resources of the application when the application is running on a server and when the network information assigned to one or more of the preferred groups is assigned to a preferred group.

40. The article of manufacture of claim 36, wherein the computer-readable code further comprises, when performing step (a):
a step to identify a user;
a step to determine if a user belongs to a preferred group; and
assign network information to a preferred group when the user belongs to a preferred group.

41. The article of manufacture of claim 36, wherein the preferred groups comprise one or more of people with disabilities and medical professionals.

42. The article of manufacture of claim 36, wherein the computer-readable code further comprises, when performing step (b):
a step to determine, at a firewall, if an application is to be blocked; and
a step to block network information from or to the application unless the network information is assigned to a preferred group.

43. The article of manufacture of claim 36, wherein the computer-readable code further comprises, when performing step (a):
a step to compare input biometric data from an individual with stored biometric data in a database;
a step to determine if the input biometric data matches the stored biometric data; and
a step to determine that the network information belongs to a preferred group when the input biometric data matches the stored biometric data.

44. An article of manufacture comprising:
a non-transitory computer-readable medium having computer-readable code embodied thereon, the computer-readable code comprising:
a step to request a prioritization privilege of an individual;
determine, by accessing a database, the prioritization privilege of the individual; and
configure a network to assign a higher priority to network information assigned to the individual when the prioritization privilege indicates that the network information belongs to a preferred group.

45. The article of manufacture of claim 44, wherein the prioritization privilege comprises one or more of dates of use information, prioritization level information, and purpose information.

46. The article of manufacture of claim 44, wherein the computer-readable code further comprises, when configuring, a step to mark the network information with a label, which indicates that the network information belongs to a preferred group, when the prioritization privilege indicates that the network information belongs to a preferred group.

47. An article of manufacture comprising:
a non-transitory computer-readable medium having computer-readable code embodied thereon, the computer-readable code comprising:
determine if an individual belongs to one or more preferred groups;
mark network information associated with the individual with a priority label; and
configure a network to assign a higher priority, as compared to network information not marked with a priority label, to the marked network information.

48. The article of manufacture of claim 47, wherein the computer-readable code further comprises, when marking network information associated with the individual with a priority label, a step to mark network information produced by an application the individual is using with a priority label.

49. The article of manufacture of claim 47, wherein the computer-readable code further comprises, when determining if an individual belongs to one or more preferred groups:
- a step to determine if the individual exists in a database that comprises the one or more preferred groups;
- a step to determine a priority privilege of the individual when the individual exists in the database; and
- a step to determine, when the individual exists in the database, if the priority privilege indicates that network information associated with the individual is to be prioritized.

50. The article of manufacture of claim 49, wherein the computer-readable code further comprises, when determining if an individual exists in a database that comprises the one or more preferred groups:
- a step to determine if biometric data entered by the individual matches biometric data for a person in the database; and
- a step to determine that the person is the individual and that the individual exists in the database when the biometric data entered by the individual matches biometric data for a person in the database.

\* \* \* \* \*